Dec. 27, 1955   J. V. BASS   2,728,542
SWITCH BOX HOLDER
Filed Aug. 28, 1950
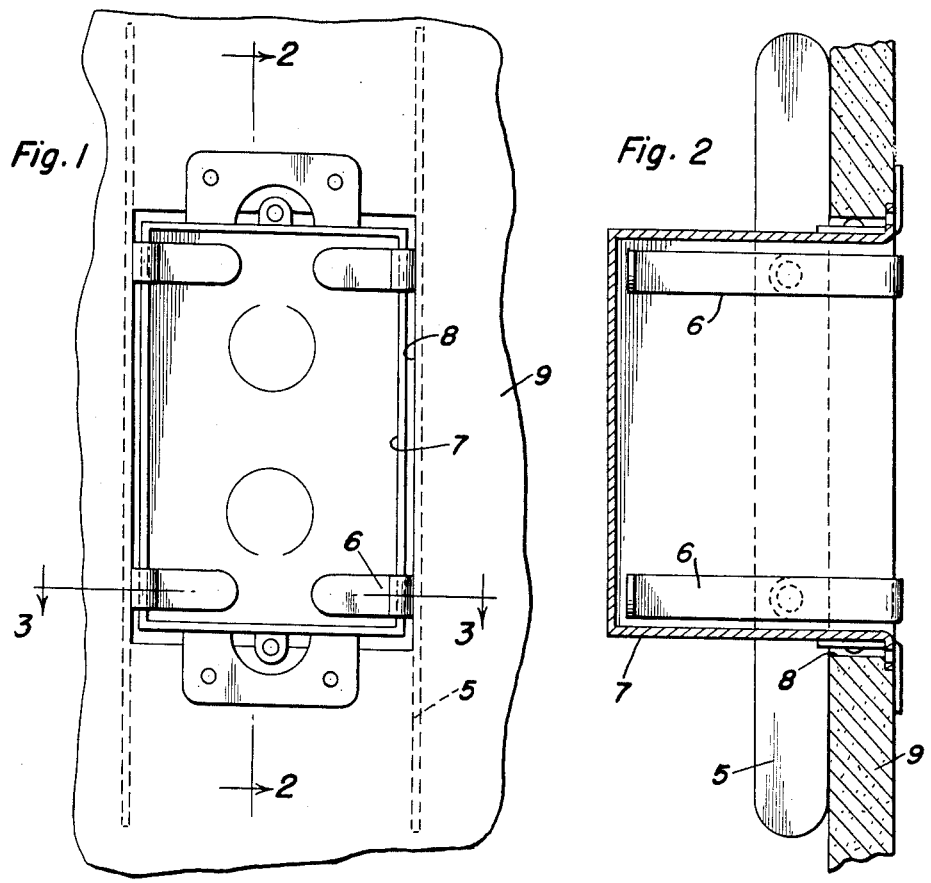
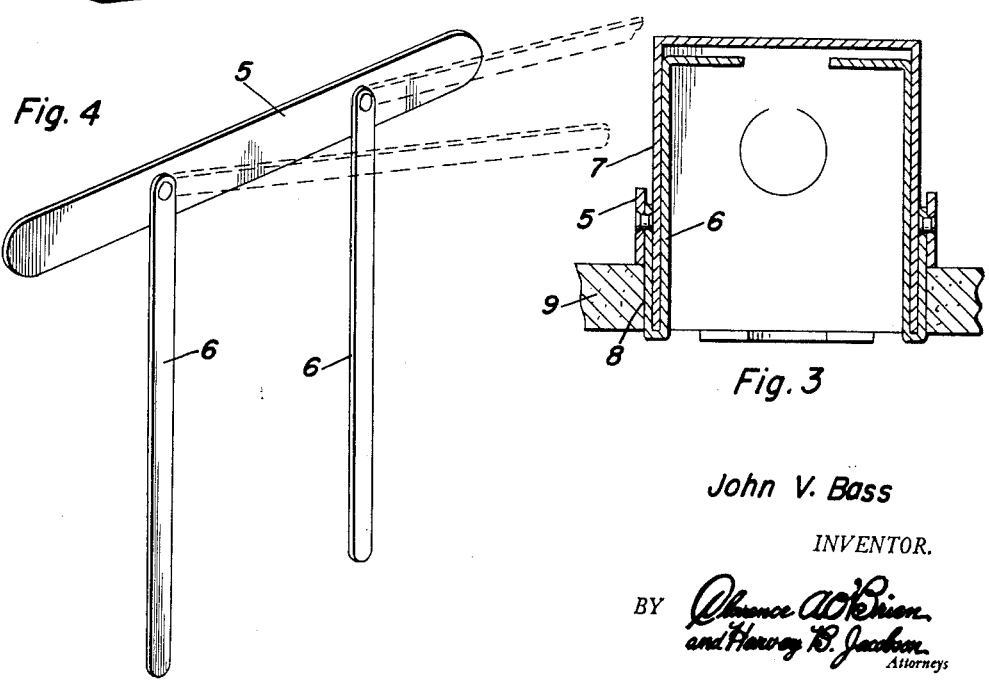
John V. Bass
INVENTOR.

United States Patent Office 2,728,542
Patented Dec. 27, 1955

2,728,542
SWITCH BOX HOLDER
John V. Bass, Dunn, N. C.

Application August 28, 1950, Serial No. 181,879

2 Claims. (Cl. 248—27)

The present invention relates to new and useful improvements in switch or outlet box holders for easily and quickly securing a switch box in a wall opening and wherein the wall may vary in thickness.

An important object of the invention is to provide a switch box holder for securing a switch box in position without the need of nails or other fasteners and wherein a relatively long clamping strap may be employed behind the wall provided with bendable fingers pivoted to the strap to facilitate insertion of the strap behind the wall after the box has been placed in the opening.

Another object is to provide a device of this character of simple and practical construction, which is strong and durable, relatively inexpensive to manufacture and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of the switch box with the holders attached thereto;

Figure 2 is a vertical sectional view taken on a line 2—2 of Figure 1;

Figure 3 is a horizontal sectional view taken on a line 3—3 of Figure 1; and

Figure 4 is a perspective view of one of the holders.

Referring now to the drawing in detail, wherein for the purpose of illustration I have disclosed a preferred embodiment of my invention, the numeral 5 designates a substantially rigid metal strap to which a pair of bendable straps or fingers 6 are pivoted at one end adjacent the ends of strap 5 for swinging the fingers 6 longitudinally of strap 5, as shown by dotted lines in Figure 4.

The device is used for holding a switch or outlet box 7 in the opening 8 of a wall 9 by swinging the fingers 6 into a substantially longitudinal position to facilitate the insertion of strap 5 into the opening 8 along one side of the box 7 to position strap 5 behind the wall, strap 5 being of a length to extend above and below the box. Fingers 6 are then bent over the outer edge of the box and inwardly thereof to clamp the box in the opening.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by spirit of the invention as herein described and the scope of the appended claims.

Having described the invention, what is claimed as new is:

1. A switch box holder for retaining a switch box in a wall opening comprising an elongated, relatively stiff strip of greater length than the height of a wall opening into which the strip is to be inserted for abutment with the back of the wall adjacent the wall opening, a pair of bendable switch box retaining fingers, one end of each finger being pivotally attached to an intermediate portion of said strip for swinging movement on an axis transverse to the length of the strip, the pivotally attached ends of said fingers being spaced from one another along said strip adapted to engage a switch box disposed in the wall opening adjacent the opposite extremities of the box.

2. In combination with a support having an opening therein within which is disposed a switch box, a switch box holder retaining said box in said opening comprising an elongated, relatively stiff strip having an intermediate portion bridging said support opening and end portions extending a substantial distance beyond said intermediate portion abutting the surface of the support adjacent said opening, a pair of spaced, generally parallel switch box holding fingers each having one end thereof pivotally attached to the intermediate portion of said strip for swinging movement about an axis transverse to the length of the strip and extending generally perpendicularly therefrom through said opening, said fingers having the free end portions thereof bent over the forward edge of said switch box adjacent the opposite extremities thereof, said fingers being swingable toward said strip to facilitate insertion of said strip through said opening.

References Cited in the file of this patent

UNITED STATES PATENTS

| Number | Name | Date |
|---|---|---|
| 389,984 | Spicer | Sept. 25, 1888 |
| 945,049 | Russell | Jan. 4, 1910 |
| 1,193,736 | Swift | Aug. 8, 1916 |
| 1,326,959 | Paine et al. | Jan. 6, 1920 |
| 1,498,868 | Charm | June 24, 1924 |
| 1,653,769 | Johnson | Dec. 27, 1927 |
| 1,793,187 | Neall | Feb. 17, 1931 |
| 1,816,584 | Hussar | July 28, 1931 |
| 1,820,309 | Judd et al. | Aug. 25, 1931 |
| 2,454,119 | Atkinson | Nov. 16, 1948 |
| 2,464,314 | Huffman et al. | Mar. 15, 1949 |